United States Patent [19]

Jerkunica et al.

[11] Patent Number: 5,802,520

[45] Date of Patent: Sep. 1, 1998

[54] SYSTEM AND METHOD FOR MANIPULATING COMPRESSED FILES

[75] Inventors: Boris M. Jerkunica; David G. Synder, both of Atlanta, Ga.

[73] Assignee: Software Builders International, L.L.C., Atlanta, Ga.

[21] Appl. No.: 714,649

[22] Filed: Sep. 16, 1996

[51] Int. Cl.$^6$ ...................................................... G06F 17/30
[52] U.S. Cl. ....................... 707/101; 707/100; 395/182.11
[58] Field of Search ..................... 395/601, 611, 395/612, 613, 614, 615, 616, 101, 201, 182.11, 507; 707/1, 100, 101, 102, 103, 104, 200

[56] References Cited

U.S. PATENT DOCUMENTS

| | | | |
|---|---|---|---|
| 5,168,444 | 12/1992 | Cukor et al. | 395/201 |
| 5,218,696 | 6/1993 | Baird et al. | 395/601 |
| 5,274,805 | 12/1993 | Ferguson et al. | 395/607 |
| 5,301,315 | 4/1994 | Pellicano | 395/604 |
| 5,355,481 | 10/1994 | Sluijter | 395/601 |
| 5,355,497 | 10/1994 | Cohen-Levy | 395/616 |
| 5,375,204 | 12/1994 | Motoyama et al. | 395/507 |
| 5,423,034 | 6/1995 | Cohen-Levy et al. | 395/610 |
| 5,463,772 | 10/1995 | Thompson et al. | 395/612 |
| 5,548,687 | 8/1996 | Motoyama | 395/101 |
| 5,555,371 | 9/1996 | Duyanovich et al. | 395/182.11 |

*Primary Examiner*—Thomas G. Black
*Assistant Examiner*—Ruay Lian Ho
*Attorney, Agent, or Firm*—Morris, Manning & Martin, L.L.P.

[57] ABSTRACT

A user may use a client program to generate requests for the contents of an overall compressed file or to retrieve particular individual files within an overall compressed file at a server. The server program responds by retrieving a summary directory within a compressed file for transmission to the client program. The summary directory identifying the contents of the overall compressed file may be displayed at the client. In response to an individual file request, an individual file extractor of the server program extracts an individual file from an overall compressed file that corresponds to an individual file identified in the individual file request. Using the client program, a user may request the merger of two overall compressed files or the modification of individual files stored within an overall compressed file. To merge two overall compressed files, a merge file generator of the server program retrieves the summary directory for each overall compressed file and transfers the individual files of the first overall compressed file only if a corresponding directory entry does not exist in the summary directory for the second overall compressed file. The merge file generator transfers all of the individual files for the second overall compressed file to the merge file. Therefore, redundant individual files are eliminated from the merge file. For modifying individual files, a modifier file generator of the client program generates a modification file command to modify or delete individual files within an overall compressed file stored at the server.

16 Claims, 4 Drawing Sheets

SYSTEM AND METHOD FOR MANIPULATING COMPRESSED FILES

FIELD OF THE INVENTION

This invention relates to compressed files, and more particularly, to compressed files which are comprised of a plurality of individually compressed files or segments.

BACKGROUND OF THE INVENTION

In an effort to provide more information through the available bandwidth of communication conduits, data compression techniques have been developed. These data compression techniques represent a dataset with fewer informational elements than contained in the original dataset. A decompressor, usually located at a remote location, uses the informational elements of the compressed representation to generate the original dataset. As a result, the communication conduit may be utilized to communicate the original dataset in less time than would be required if the actual information elements of the original dataset were transferred through the conduit.

The compression of datasets is particularly significant on wide area networks ("WANs"), including the Internet which is really a network of networks. Because the communication conduits which couple many of the nodes in the network differ in bandwidth, a communication conduit bandwidth cannot be assumed for the transfer of data across the network. In many such networks, nodes may be connected by communication conduits having significant bandwidth such as T1 or T3 conduits. However, these nodes in turn may be coupled to a network which services users through a twisted pair telephone wire which has a significantly lower bandwidth. While datasets may be quickly communicated from one node to another through a T1 or T3 conduit, the transmission of that same dataset from the receiving node to a user over twisted pair wire may involve significant download time. Thus, to the extent that the amount of data required to satisfy a user's request for a dataset can be reduced, the communication load on the conduit coupling the user to the network is likewise reduced.

While compression techniques may significantly reduce the size of an original dataset to reduce the transmission times of datasets to a user on a network, these compression techniques may still provide too much information to a user. For example, many server sites on the Internet or other types of networks may individually compress files and then compress these files together in an overall compressed file. Using information conveyed through a homepage or other viewable content descriptor, a user may become aware of a file within an overall compressed file which the user desires to view and evaluate. To obtain one of the files within a compressed file, the user must download the entire compressed file and, using a decompressor, decompress the entire compressed file to obtain all of the files within the compressed file. Afterwards, the user may view and evaluate the one file which interested the user. While the compression of all of the data files reduces the amount of data required for the transfer for the overall file over the communication conduit, any one file is not readily accessible to a user over the network. What is needed is a way to extract from an overall compressed file only the file or files which are responsive to a user's request and send those files in a compressed form to the user for viewing and evaluation.

Users on a network may also provide an overall compressed file containing individual compressed files or segments to another node for storage or use. From time to time, the user may update one or more of the individual files contained within the overall compressed file previously provided to another node. In order to update or modify the contents of an individual compressed file at the remote location, the user must update the individual file at the user's site, include that file with the files previously used to generate the overall compressed file, and compress all of the files together to generate the overall compressed file for transmission to the remote site. At the remote site, the overall compressed file is used to replace the previously received overall compressed file. This process requires that even though a user has modified only one file within an overall compressed file, the user must generate another overall compressed file each time the user wants to update a single file at a remote location. In a similar manner, if a user wishes to delete a file from a compressed file at a remote location, the user must regenerate the overall compressed file without including the file to be deleted and then transmit the overall compressed file to the remote location for replacing the previously transmitted overall compressed file. What is needed is a method for allowing a user to modify a file within a previously transmitted overall compressed file without requiring the regeneration of another overall compressed file.

Another limitation of current networks occurs when a user determines that two overall compressed files each include at least one unique file which the user would like to view and evaluate. In order to do this, the user must download both overall compressed files, decompress both overall compressed files, and view and evaluate the one particular file within each overall compressed file the viewer wishes to view and evaluate. Not only does the downloading of each overall compressed file require more data than is necessary to satisfy the user's request, the files may contain redundant information between the files themselves. That is, both of the overall compressed files may contain one or more common compressed files. What is needed is a way of specifying and merging the contents of two compressed files together without including redundant files.

SUMMARY OF THE INVENTION

The above limitations are overcome by a system and method performed in accordance with the principles of the present invention. This system includes a remote communicator for communicating file requests to a server and a summary directory extractor for extracting a summary directory for an overall compressed file identified by one of said communicated file requests. The extracted summary directory may be used to identify the files comprising an overall compressed file and the location of each file within the overall compressed file. The extracted summary directory may then be communicated to provide a user with identification of the files within the overall compressed file. Using this information, the user may communicate a request for one or more files within an overall compressed file.

A file extractor may also be provided in the system of the present invention which uses a summary directory retrieved by the summary directory extractor to locate a specified file within an overall compressed file so the identified file may be extracted. The extractor places the extracted compressed file in a new overall compressed file and transmits the new overall compressed file to the user for viewing and evaluation. In this manner, the file extractor sends only the files responsive to a user's request. This selective retrieval of files from an overall compressed file reduces the time required for transmission of information responsive to a user's request.

The system of the present invention may also be provided with a merge file generator for merging the contents of two overall compressed files together without including redundant information in the files. The merge file generator includes a directory comparator which uses the summary directory for each overall compressed file retrieved by the summary directory extractor and then compares the directories identified by the directory entries in the summary directory to determine which individual files are contained in both directories. The contents of a first overall compressed file are then transferred to a merge file unless the directory for the second overall compressed file includes a directory entry for the same file. In that case, the file is not transferred. Once all of the files unique to the first overall compressed file have been transferred to the merge file, the files for the second overall compressed file are moved to the merge file. Since all of the files common to both overall files were not transferred from the first overall compressed file, the contents of the second overall compressed file may be transferred to the merge file without examining the directory for redundant entries. As a result, the system of the present invention permits a user to merge overall compressed files without including redundant individual files.

The system of the present invention may also include a modification file generator which may be used to modify the content of an individual file stored in an overall compressed file at a remote location. A client modifier file generator generates a modifier file containing one or more modified individual files corresponding to individual files in an overall compressed file at a user's site. The modification file generator at the remote site uses the modified files in the modifier file to identify the overall compressed file and a corresponding individual file within the overall compressed file. The individual file is then extracted from the overall compressed file and replaced with the corresponding modified file and directory information from the modifier file. Preferably, the modified file may include a delete indicator which may be used to effectively remove the individual file from the overall compressed file. By using the components of a system made in accordance with the principles of the present invention, a user may modify individual files within an overall compressed file without having to regenerate the entire overall compressed file for transmission to the remote location.

These an other advantages of the present invention may be ascertained from the detailed specification set forth below in conjunction with the drawings provided herewith.

DETAILED DESCRIPTION OF THE INVENTION

Figure 1:
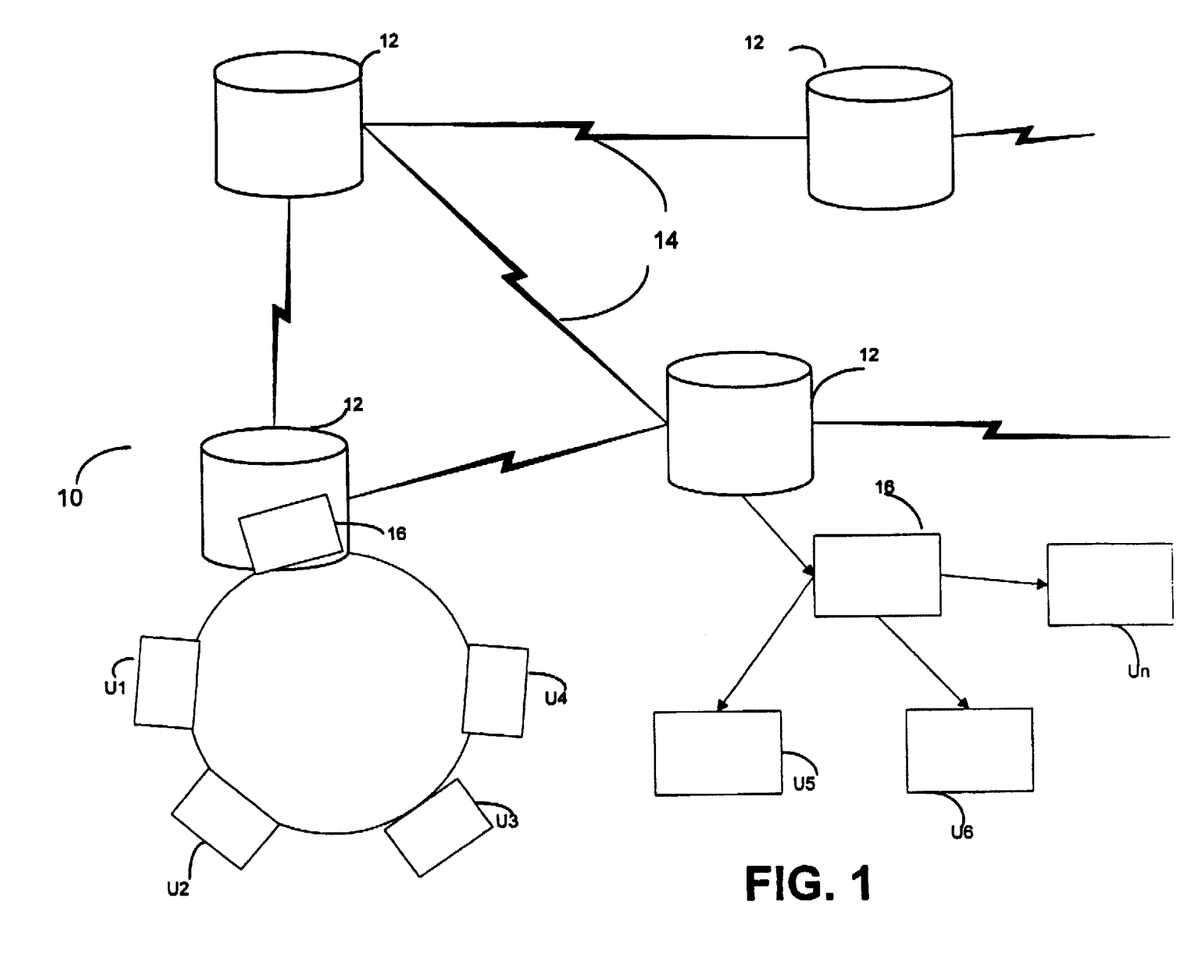
FIG. 1 is a schematic diagram of a network in which the system and method of the present invention are used.

A network in which the system and method of the present invention are implemented is shown in FIG. 1. Network 10 includes a plurality of servers 12 which are coupled through communication links 14. Communication may proceed from any server in the network to another server in the network through any of the paths available through network 10. Any of these servers may also be coupled to a local area network controller 16 which may be used to interface a plurality of users U1–Un to network 10. The structure shown in FIG. 1 is a network which permits users on a local network associated with any of the servers to be able to communicate with any of the servers or users coupled to the servers in the network. Typically, the users utilize a personal computer (PC) to communicate with the servers or other users coupled to servers 12 on network 10.

Figure 2:
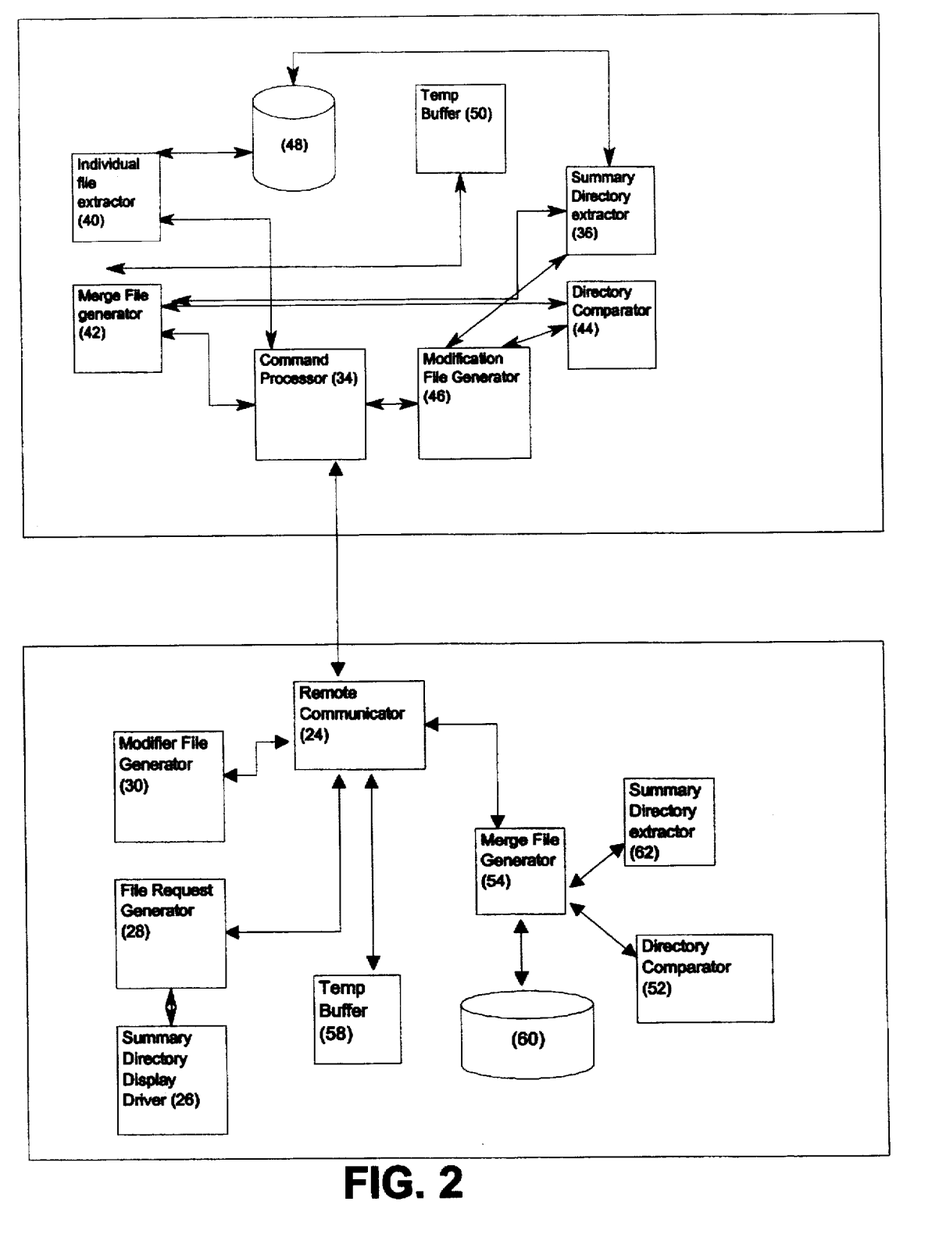
FIG. 2 is a block diagram of the server and client components of the system of the present invention.

The preferred structure of a system that implements the method of the present invention is shown in FIG. 2. The system includes components for a server program 20 which resides on server 12 and components for a client program 22 which may reside on a user's computer at U1–Un of network 10. These components are preferably implemented in software only, although hardware only or hardware/software combination components may be used to implement the present invention. The programs 20,22 may execute on a personal computer (PC). A point-to-point communication path is shown in FIG. 2 from the user's PC to the file manipulator, however, as discussed above, this communication may be a circuitous one through more than one server coupled to the network system. Client program 22 of the compressed file manipulation program operating on a user's personal computer includes a remote communicator 24 which is coupled to a summary directory display driver 26, a file request generator 28, a directory comparator 52, a merge file generator 54, a summary directory extractor 62, and a modifier file generator 30. The computer on which client program 22 resides may also include file storage space 60 for the storage of the overall compressed files and memory to support a temporary buffer 58. Server program 20 of the compressed file manipulation program includes a command processor 34, a summary directory extractor 36, an individual file extractor 40, a merge file generator 42, a directory comparator 44 and modification file generator 46. Server 12 on which server program 20 resides also includes file storage space 48 for the storage of overall compressed files and memory to support a temporary buffer 50. Programs 20 and 22 execute on an IBM PC computer or equivalent which uses a 80486 processor or better with at least 1 MB of RAM and 2 MB of hard disk storage.

In more detail, remote communicator 24 is used to communicate summary directory requests, file requests and file commands to a server program 20. Remote communicator 24 may be a commercially available Internet browser for the transfer of files implemented in the HTML language or the like for network communication, although other known open network communication software and hardware maybe used. The summary directory display driver 26 is used to display summary directory information obtained from a summary directory of an overall compressed file stored on a server 12 so a user may view information regarding the contents of an overall compressed file. The file request generator 28 accepts input from a user, provided through a mouse 32 or other known input devices, to generate a summary directory request, a file request, a merge file command or a modify file command. The request or command may then be communicated by remote communicator 24 to command processor 34 of a server 12.

Figure 3:
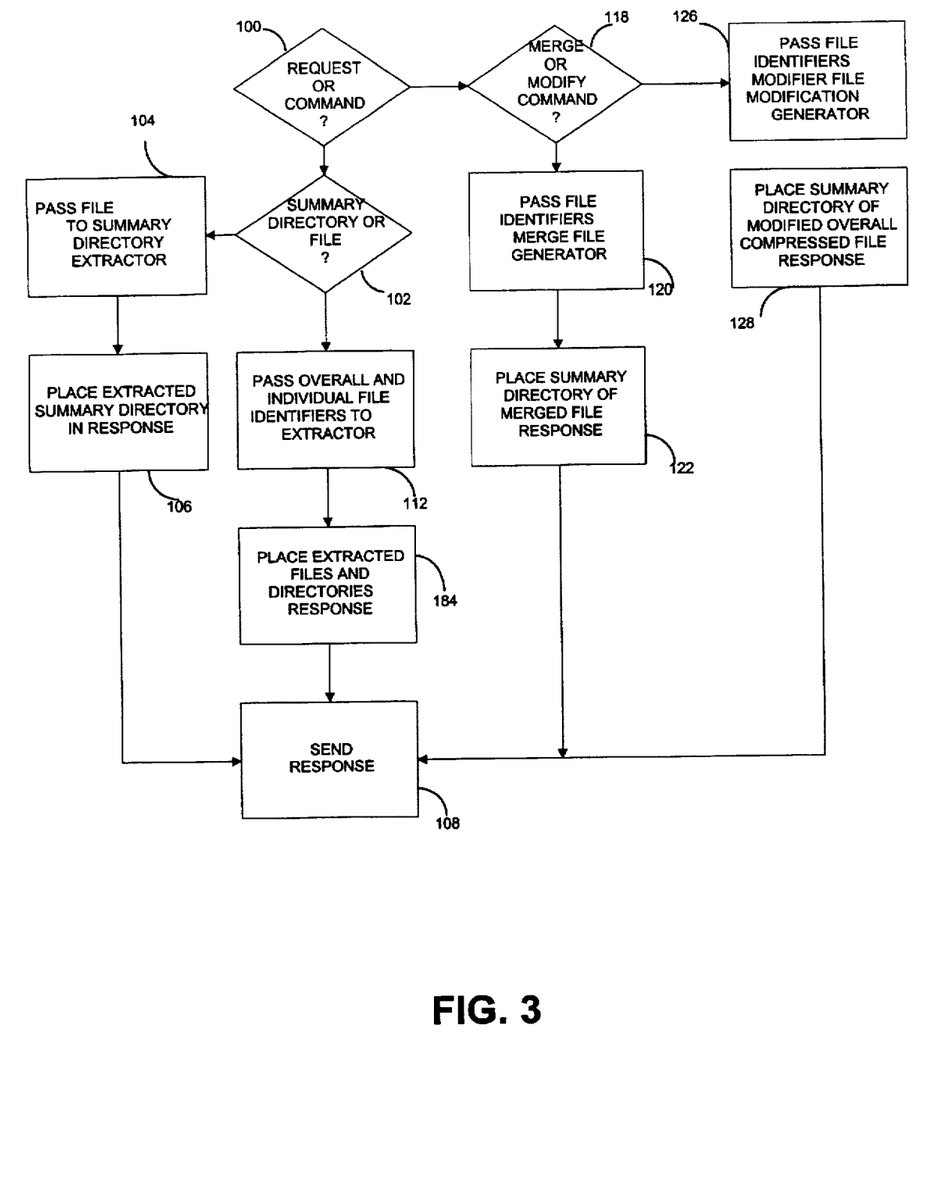
FIG. 3 is a flow chart of a preferred process performed by the command processor of FIG. 2.

The process performed by command processor 34 is shown in FIG. 3. Command processor 34 begins by determining whether the message received from a client is a request or a command (Block 100). If it is a request, it then determines whether it is a summary directory request or a file request (Block 102). If it is a summary directory request, the file identifier is passed to the summary directory extractor (Block 104). As discussed in more detail below, the summary directory extractor extracts the summary directory from the overall compressed file corresponding to the file identifier. This extracted summary directory is returned through the command processor which then places the extracted summary directory in a response (Block 106). This response is then sent to the client which transmitted the original request (Block 108).

If the request is a file request, the overall and individual file identifiers are passed to file extractor 40 (Block 112). As described in more detail below, file extractor 40 extracts individual compressed files from an overall compressed file and returns the extracted files and the corresponding directories to command processor 34. Command processor 34 places the extracted files and directories in a response (Block 114) and the response is returned to the client which transmitted the request (Block 108).

If the message was a command, command processor 34 determines whether it is a merge or a modify command (Block 118). If it is a merge command, the file identifiers are passed to the merge file generator 42 (Block 120). As discussed in more detail below, merge file generator 42 obtains the overall compressed files identified by the file identifier and merges the individual compressed files of the overall compressed files into a single overall compressed file without any duplication of individual files. The merged file and its summary directory are provided to command processor 34. Command processor 34 places the merged file and its summary directory in a response (Block 122) and returns the response to the client which transmitted the merge command (Block 108).

If the command transmitted by a client was a modify command, the file identifiers and modifier file are passed to the modification file generator 46 (Block 126). Modification file generator 46, as explained in more detail below, uses the summary directory of the overall compressed file identified in the command to locate the individual file to be modified. The contents of the individual file are then replaced with the modifier file and the summary directory of the overall compressed file is modified to correspond to the new data. A summary directory of the modified overall compressed file is returned to command processor 34. Command processor 34 places the summary directory of the modified overall compressed file (Block 128) in a response. This response is then returned to the client which transmitted the modified command (Block 108).

Figure 4:
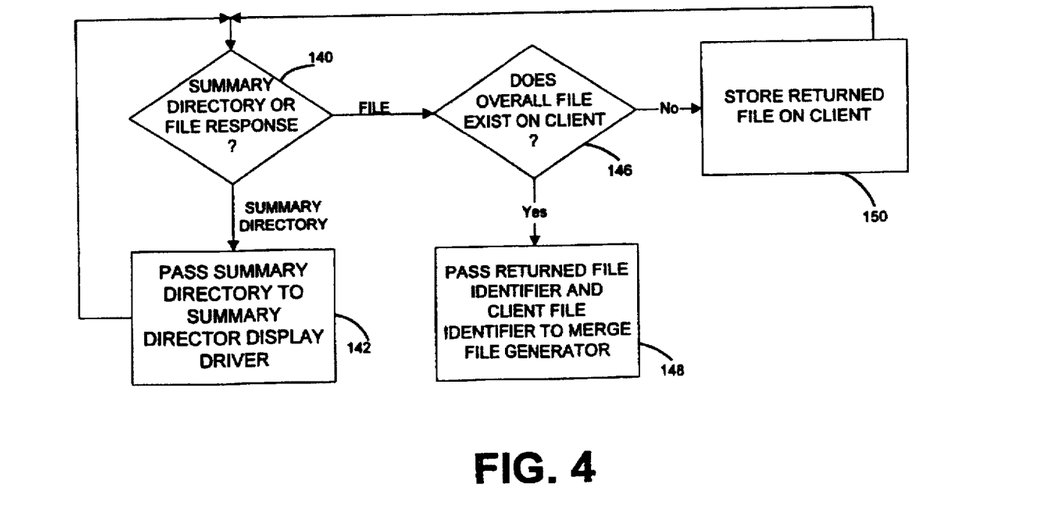
FIG. 4 is a flow chart of a preferred process performed by the remote communicator of FIG. 2.

The processing performed by remote communicator 24 upon receiving a response from a server is shown in FIG. 4. Response processing begins by determining whether the response contains a summary directory only or includes a file (Block 140). If it includes a summary directory only, the summary directory is passed to the summary directory display driver 26 so the user may view the summary directory requested (Block 142). If the response includes a file, remote communicator 24 determines whether the overall compressed file identified in the response already exists on the client (Block 146). If it does, the overall compressed file identifier contained in the response and the overall compressed file identifier for the client file are passed to the merge file generator 54. As explained in more detail below, merge file generator 54 combines the contents of the returned file with the file in the client system and generates a new summary directory for the merged overall compressed file. Merged file generator 54 then stores the merge file on the client and passes the summary directory for the merge file to summary directory display driver 26 for display. If the overall file returned in a response does not already exist in the client, the overall compressed file in the response is stored on the client (Block 150).

The file merger process preferably begins with remote communicator 24 copying the returned summary directory or files to the temp buffer 58. If the overall compressed file name already exists in temp buffer 58, it then uses the merge file generator 54 to merge the summary directory or files with the already existing overall compressed file. The merge file generator 54 uses summary directory extractor 62 to extract the summary directory from each overall compressed file identified in the merge file request. These summary directories are supplied to directory comparator 52 which identifies the files which are common to both of the overall compressed files. Merge file generator 54 then copies the contents of the first overall compressed file to temporary buffer 58 but excludes those individual files which correspond to a match indicator generated by directory comparator 52. The individual files of the second overall compressed file are then transferred to temporary buffer 58. Merge file generator 54 then generates a new summary directory for the compressed files of the first and second compressed files stored in temporary buffer 58. The user may then use and display the retrieved files or save them to storage 60.

A user may also use remote communicator 24 to send a merge file request to command processor 34. The merge file request identifies two or more overall compressed files which the user wants combined into one file for transfer. In response to a merge file request, merge file generator 42 uses summary directory extractor 36 to extract the summary directory from each overall compressed file identified in the merge file request. These summary directories are supplied to directory comparator 44 which identifies the files which are common to both of the overall compressed files. Merge file generator 42 then copies the contents of the first overall compressed file to temporary buffer 50 but excludes those individual files which correspond to a match indicator generated by directory comparator 44. The individual files of the second overall compressed file are then transferred to temporary buffer 50. Merge file generator 42 then generates a new summary directory for the compressed files of the first and second compressed files stored in temporary buffer 50. This merged file and its summary directory may then be transmitted to client program 22 through command processor 34.

Modifier file generator 30 is activated by a user to supply a server with one or more modifier files which may be used to replace the contents of a individual file in an overall compressed file stored on a server 12. Modifier file generator 30 identifies a modifier file which contains the new content for an individual file and compresses each file and its corresponding directory. A summary directory identifying each modifier file within an modification file is generated if more than one modifier file is being sent. A modification file request identifies the overall compressed file at the server and the individual file or files to be replaced and contains the compressed modifier file or files. The modification file compressed command is sent to the corresponding server program 20 using remote communicator 24. Command processor 34 provides the modification file command to modification file generator 46 which uses summary directory extractor 36 to obtain the summary directory of the overall compressed file identified in the request. The extracted directory is supplied to directory comparator 44.

Directory comparator 44 compares the entries in the extracted summary directory with an individual file identifier in the request until it generates a match indicator. This information is provided to modification file generator 46 which replaces the individual file stored in the overall compressed file with the corresponding compressed modifier file in the modification file command. The summary directory for the overall compressed file is also altered to reflect the file replacement. This process continues for each of the identified files in the request until all of the individual files identified in the modification request have been replaced by a compressed modifier file in the command. In response to a compressed modifier file including a predetermined value, for example, −1, modification file generator 46 deletes the individual file from the overall compressed file and modifies the summary directory for the overall compressed file accordingly. In this manner, a user may modify the contents of an individual file already existing in an overall compressed file or delete an individual file from an overall compressed file without having to transmit an overall compressed file containing modified files to replace the overall compressed file stored at a server 12. The overall compressed file generated by modification file generator 46 or the summary directory of such a file may then be transmitted to client program 22 through command processor 34.

Figure 5:
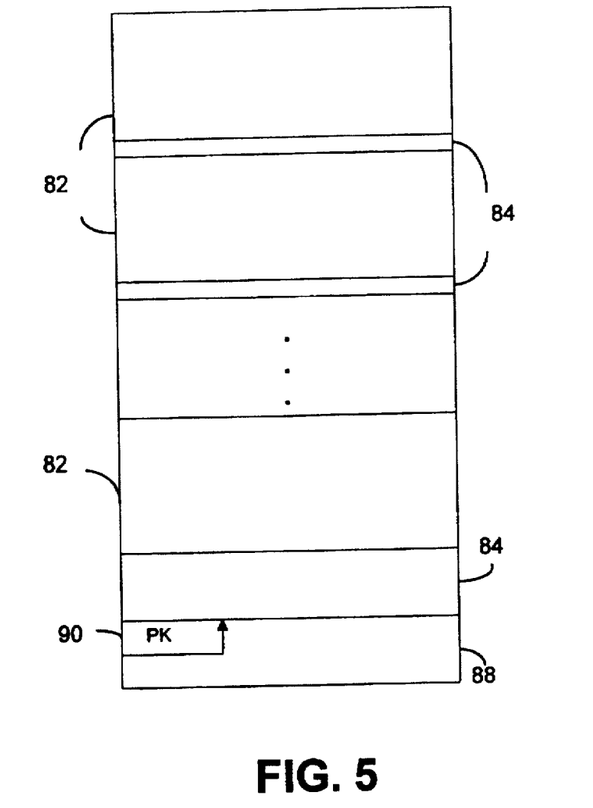
FIG. 5 is a schematic diagram of the structure of a PK overall compressed file on which the system and method of the present invention may be used.

The principles of the present invention are not limited to a particular implementation. Instead, the system and method of the present invention may be applied to any overall compressed file comprised of individual files or segments each of which are identified by a directory and a summary directory which identifies all of the individual files and the location of each in the overall compressed file. One particular data compression technique for which the present invention has been implemented is the PK compression technique. To enhance the reader's understanding of the present invention, the structure of a file compressed using the individual PK technique is shown in FIG. 5. FIG. 5 shows that the overall compressed file 80 is comprised of individual files 82 separated by directories 84. Each of these directories 84 provides information about the content of its corresponding individual file 82 which has been compressed using the PK data compression technique. The contents of this directory are well known to those of ordinary skill in the art.

Data relevant to the present invention stored in this directory includes the identification of the starting location for the compressed individual file within the overall compressed file. By using this information, the first information unit such as a byte or word of an individual file may be identified and the end of the compressed individual file is identified as the last information unit of the compressed file prior to the first information unit of the directory for the individual file. Because the data for an individual file and its corresponding directory are indistinguishable, the PK data compression technique includes a summary directory 88 at the end of the overall compressed file. The summary directory, sometimes called a central directory, includes entries which identify the location of the first information unit of each of the directories stored within the overall compressed file. Using this information, the file manipulation program of the present invention may identify the first information unit of each directory in the file and the last information unit of the individual file for that directory. Using the information in a directory, the program may ascertain the first information unit location of the compressed individual file. In order to successfully locate the summary directory, the file manipulation program searches the summary directory backwards from the last information unit of the overall file looking for the PK signature block 90. The PK signature block is a block which identifies the first byte of the summary directory for an overall file and has the value of 504B0102h. Once the PK signature byte has been located, the program may identify the contents of the summary directory, and in turn, identify the location of the individual file directories and individual files contained within an overall compressed file. Once this information is known, the summary directory may be copied from an overall compressed file to identify the individual files contained within the overall compressed file. Also using this information, individual files may be extracted, modified, or deleted from a compressed file. If the location of any directory changes as a result of the manipulation of the overall compressed file, the pointers in the summary directory may be modified accordingly.

In use, the server program 20 of the file manipulation program is provided at servers 12 throughout a network and each user may use a client program 22 on their PC or other computer coupled to the network. Remote communicator 24 includes a browser application or other network communication program to view information available on the various servers on the network. When a user finds a server which describes information about a group of files contained within an overall compressed file which appeals to the user, the user may activate file request generator 28 to obtain a listing of the files within an overall compressed file stored on a server. The content request message is transmitted to the command processor of the file manipulation program on the corresponding server which activates summary directory extractor 36. Summary directory extractor 36 extracts the summary directory from the overall compressed file identified by the request and returns the summary directory to the client. Summary directory display driver 26 then provides the information within the summary directory to the user. Using this information, the user may use file request generator 28 to select one or more of the files identified by the displayed summary directory and this information is incorporated in a file request generated by file request generator 28. The file request message is transmitted by remote communicator 24 to the server file manipulation program which provides the file request information identifying the overall file and individual file to extractor 40. Extractor 40 then extracts the identified individual file or files from the overall compressed file, generates a new overall compressed file with only the identified fields and returns it to the remote user. If an overall compressed file with the same name already exists on the client, the new overall compressed file is then merged with the old overall compressed file. The merge file generator 54 uses summary directory extractor 62 to extract the summary directory from each overall compressed file identified in the merge file request. These summary directories are supplied to directory comparator 52 which identifies the files which are common to both of the overall compressed files. Merge file generator 54 then copies the contents of the first overall compressed file to temporary buffer 58 but excludes those individual files which correspond to a match indicator generated by directory comparator 52. The individual files of the second overall compressed file are then transferred to temporary buffer 58. Merge file generator 54 then generates a new summary directory for the compressed files of the first and second compressed files stored in temporary buffer 58. A user may then view the merged file and determine whether it should be stored at the user site for further use.

Using known techniques, a user may provide an overall compressed file containing individual files to a server 12 for storage. At a later time, if the user chooses to modify one or more of the individual files in the overall compressed file, the user may activate modifier file generator 30. The modifier file generator 30 retrieves a modifier file, which preferably contains the new file content provided by the user, along with a directory identifying the new individual file. One or more modifier files and their corresponding directories may be compressed and grouped together with a summary directory for a modification file command. If the user wishes to delete any file from an overall compressed file stored at the server, an appropriate header with a predetermined value is used as the modifier file to be included in the modification file command. The modification file command is then transmitted to the file manipulation program at the server which forwards the modification file command to modification file generator 40. Modification file generator 40 uses summary directory extractor 36 to extract the summary directory information for the overall compressed file containing an individual file to be modified. This summary directory and the summary directory for the modifier files are passed to directory comparator 44. Directory comparator 44 compares the data entries in the summary directory for the overall compressed file to the directory entries in the summary directory for the modifier files and where a match indicator is generated, replaces the individual file in the overall file and its corresponding directory with the corresponding modifier file and directory. If the content of a modifier file indicates that the individual file is to be deleted, the modification file generator 40 deletes the individual file from the overall compressed file. After all of the modifier files have been used to either replace individual files or delete such files within the overall compressed file, the summary directory for the overall compressed file is updated and modified overall compressed file is stored at the server.

Should a user decide to merge two overall compressed files for transmission to the user, file request generator 28 sends a merge message to server program 20 which identifies the two overall compressed files. The command processor 34 identifies the merge command and provides the merge message to merge file generator 40. Merge file generator 42 then provides information identifying the two overall compressed files to summary directory extractor 36 which retrieves the summary directory for each of the identified overall compressed files. These summary directories are then provided to directory comparator 44 which retrieves the first directory entry in a first one of the summary directories and looks for a corresponding match in the second summary directory. If no match is found, the corresponding individual file is copied from the first compressed file into a temporary buffer along with its directory. If a match is found, merge file generator 42 goes to the next file entry without copying the matching file from the first compressed file. Merge file generator 42 continues by looking for a corresponding match in the remaining entries of the first directory. This process continues until all of the file entries in the summary directory for the first overall compressed file are compared to the directory entries in the second summary directory. For each directory entry in the second summary directory, merge file generator 42 transfers the corresponding individual file and directory into temporary buffer 50. After all of the individual files and directories have been collected in temporary buffer 50, a summary directory is generated for the new merge file. This merge file is then returned to the user.

While the present invention has been illustrated by a description of preferred and alternative embodiments and processes, and while the preferred and alternative embodiments processes have been described in considerable detail, it is not the intention of the applicants to restrict or in any way limit the scope of the appended claims to such detail. Additional advantages and modifications will readily appear to those skilled in the art.

What is claimed is:

1. A system for use in extracting an individual file from an overall compressed file comprising:

a remote communicator at a remote location for communicating file requests to a server; and a summary directory extractor at said server for extracting a summary directory for an overall compressed file identified by said file request.

2. The system of claim 1 further comprising a command processor for communicating said extracted summary directory to said remote communicator; and a summary directory display driver at said remote location for displaying said summary directory.

3. The system of claim 2, further comprising:

an individual file extractor for extracting individual files from said overall compressed file identified by a communicated file request, said extracted individual file being communicated to said remote communicator through said command processor.

4. A system for extracting an individual file from an overall compressed file comprising:

a remote communicator at a remote location for communicating file requests to a server;

a summary directory extractor at said server for extracting a summary directory for an overall compressed file identified by said file request a command processor for communicating said extracted summary directory to said remote communicator:

a summary director display driver at said remote location for displaying said summary directory:

an individual file extractor for extracting individual files from said overall compressed file identified by a communicated file request, said extracted individual file being communicated to said remote communicator through said command processor:

a directory comparator for comparing directory entries for a summary directory of a first overall compressed file with directory entries in a summary directory of a second overall compressed file to generate match indicators for individual files which exist in both of said first overall compressed file and said second overall compressed file; and a merge file generator for generating a merge file comprised of all files comprising said first and second overall compressed files for which said directory comparator did not generate a match indicator so that only one copy of said files for which said directory comparator generates a match indicator are placed in said merge file.

5. The system of claim 4, further comprising:

a modifier file generator for generating a modification file command which includes a modifier file for modifying an individual file in an overall compressed file stored at said server, each said modifier file having a corresponding directory and said modification file command having a summary directory to identify each modifier file in said modification file command; and a modification file generator at said server for replacing an individual file in an overall compressed file stored at said server with a modifier file in said modification command.

6. The system of claim 5, wherein said modifier file includes one of new content to replace an individual file stored at said server and a predetermined value to indicate deletion of an individual file stored at said server.

7. The system of claim 4 wherein said merge file generator merges files stored at said server in response to a merge file command being received at said server.

8. The system of claim 4 wherein said merge file generator merges files stored at said remote location in response to an overall compressed file received from said server having a overall file identifier that matches an overall file identifier for an overall compressed file stored at said remote location.

9. A method for obtaining information from an overall compressed file stored on a server remote from a client comprising the steps of:

communicating a request to a server for a summary directory for an overall compressed file stored at said server;

extracting a summary directory from said overall compressed file identified by said communicated request;

returning said extracted summary directory to a client which communicated said request; and displaying at said client said extracted summary directory to identify files contained within said overall compressed file stored at said server.

10. The method of claim 9 further comprising the steps of:

communicating a request for at least one file stored within an overall compressed file stored at said server;

extracting said file identified by said communicated file request from said overall compressed file; and returning said extracted file to said client which communicated said file request.

11. A method for obtaining information from an overall compressed file stored on a server remote from a client comprising the steps of:

communicating a request to a server for a summary directory for an overall compressed file stored at said server:

extracting a summary directory from said overall compressed file identified by said communicated request:

returning said extracted summary directory to a client which communicated said request;

displaying at said client said extracted summary directory to identify files contained within said overall compressed file stored at said server;

communicating a request for at least one file stored within an overall compressed file stored at said server:

extracting said file identified by said communicated file request from said overall compressed file;

returning said extracted file to said client which communicated said file request;

comparing an overall compressed file identifier for said returned file to overall compressed file identifiers stored on said client to determine whether said overall compressed file identifier for said returned file matches one of said overall compressed file identifiers on said client; and merging said returned file with said overall compressed file on said client in response to a match being determined between said overall compressed file identifier for said returned file and said overall compressed file on said client.

12. The method of claim 11 said merging step further comprising the steps of:

comparing directory entries for a summary directory of said returned overall compressed file with directory entries in a summary directory of said overall compressed file to generate match indicators for individual files which exist in both of said returned overall compressed file and said overall compressed file on said client; and generating a merge file comprised of all files comprising said returned and overall compressed files on said client for which said directory comparator did not generate a match indicator so that only one copy of said files for which said directory comparator generates a match indicator are placed in said generated merge file.

13. The method of claim 9, further comprising the steps of:

communicating a modification file command having a modifier file for modifying an individual file in an overall compressed file stored at said server, each said modifier file having a corresponding directory and said modification file command having a summary directory to identify each modifier file in said modification file command; and replacing an individual file in an overall compressed file stored at said server with a modifier file in said modification command.

14. The method of claim 13 said replacing step further comprising the step of:

determining whether said modifier file includes one of new content to replace an individual file stored at said server and a predetermined value to indicate deletion of an individual file stored at said server;

deleting said individual file in response to said predetermined value being in said modifier file; and replacing said individual file with said modifier file in response to said modifier file containing new content.

15. A method for obtaining information from an overall compressed file stored on a server remote from a client comprising the steps of:

communicating a request to a server for a summary directory for an overall compressed file stored at said server;

extracting a summary directory from said overall compressed file identified by said communicated request;

returning said extracted summary directory to a client which communicated said request:

displaying at said client said extracted summary directory to identify files contained within said overall compressed file stored at said server;

communicating a merge file command having a first overall compressed file identifier and a second overall compressed file identifier for first and second overall compressed files stored on said server; and merging said first and said second overall compressed files into a merge file in response to said merge file command being received by said server.

16. The method of claim 15, said merging step further comprising the steps of:

comparing directory entries for a summary directory of said first overall compressed file identified in said merge file command with directory entries in a summary directory of said second overall compressed file identified in said merge file command to generate match indicators for individual files which exist in both of said first overall compressed file and said second overall compressed file; and generating said merge file from all files comprising said first and second overall compressed files for which said directory comparator did not generate a match indicator so that only one copy of said files for which said directory comparator generates a match indicator are placed in said merge file.

* * * * *